Figure 1:
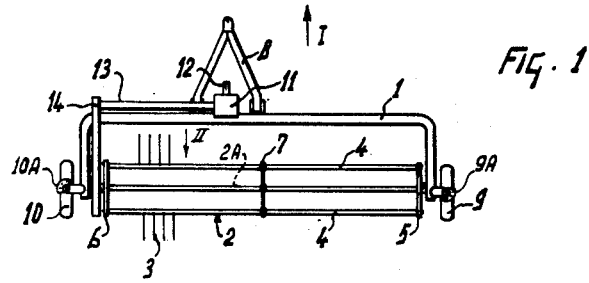

April 7, 1964 C. VAN DER LELY 3,127,727
TEDDERS
Filed July 6, 1961 2 Sheets-Sheet 1

INVENTOR.
CORNELIS VAN DER LELY
BY
Mason, Mason & Albright
ATTORNEYS

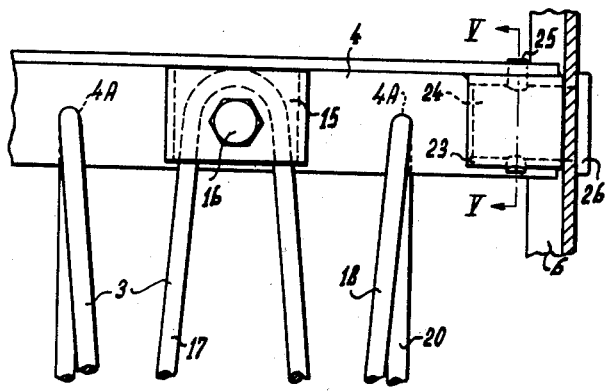
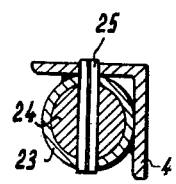
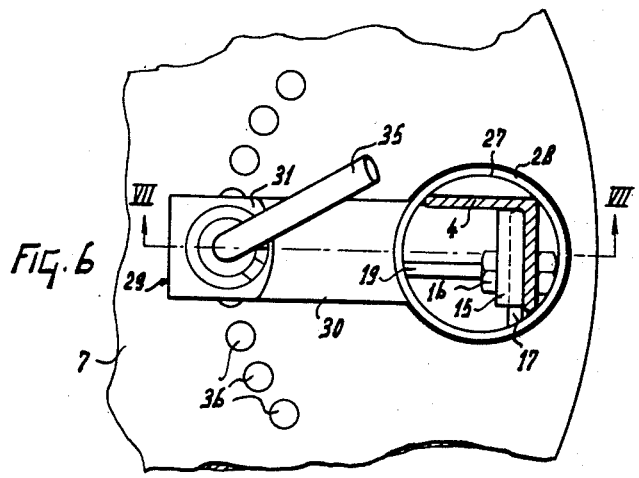
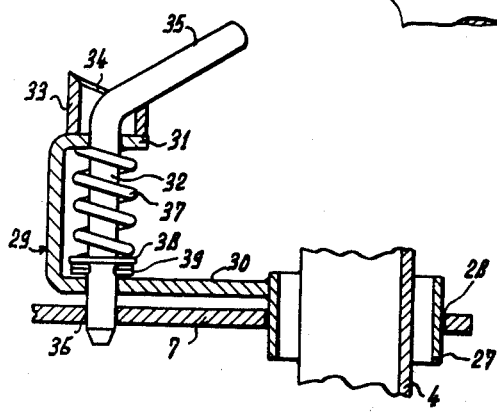

UNITED STATES PATENT OFFICE 3,127,727
Patented Apr. 7, 1964

3,127,727
TEDDERS
Cornelis van der Lely, Zug, Switzerland, assignor to
C. van der Lely N.V., Maasland, Netherlands, a Dutch
limited-liability company
Filed July 6, 1961, Ser. No. 122,295
Claims priority, application Netherlands July 12, 1960
5 Claims. (Cl. 56—372)

This invention relates to tedders of the kind comprising a frame in which an at least approximately cylindrically shaped body is rotatably mounted, the body being provided with tines which are adapted to displace crop or like material during operation of the tedder. The words "at least approximately cylindrically shaped body" are to be interpreted throughout this specification as including a body which, upon rotation about an axis provided for that purpose, generates an approximately cylindrically shaped figure.

An object of the invention is the provision of a tedder of simple construction in which at least some of the tines are adjustably mounted.

According to the present invention there is provided a tedder of the kind set forth, wherein the said body includes support members and a plurality of tined bars supported thereby, at least one of the bars being turnable with respect to the support members about a pivotal axis extending parallel or substantially parallel to the axis of rotation of the body, and wherein retaining means is provided on the said bar and is situated between the tines mounted on the said bar, the retaining means being arranged to enable the bar to be maintained in any one of a number of different angular settings about said pivotal axis.

The invention relates further to a device of the kind set forth, wherein the said body includes support members and a plurality of tined bars supported thereby and wherein each tine is rigidly secured to a corresponding bar at a first location and is movable with respect to a bearing provided on the bar at a second location, the arrangement being such that a bent portion of the tine extends between the said two locations, the bent portion being located in a plane which is inclined at an angle of other than 90° to the axis of rotation of the said body.

Further the invention relates to an implement for working crop or like material lying on the ground, including a plurality of tined bars whose ends are journalled in support members arranged to rotate during operation of the implement, wherein the ends of the said bars are provided with heads arranged relative to the support members in such a way that the bars are prevented from making any substantial axial movements, the said heads being so shaped that accumulations of crop and other material do not tend to adhere thereto.

Figure 2:
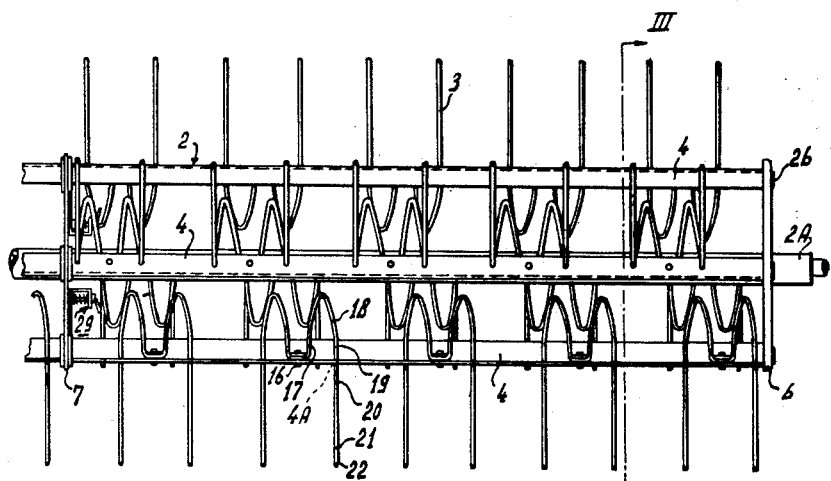
Figure 3:
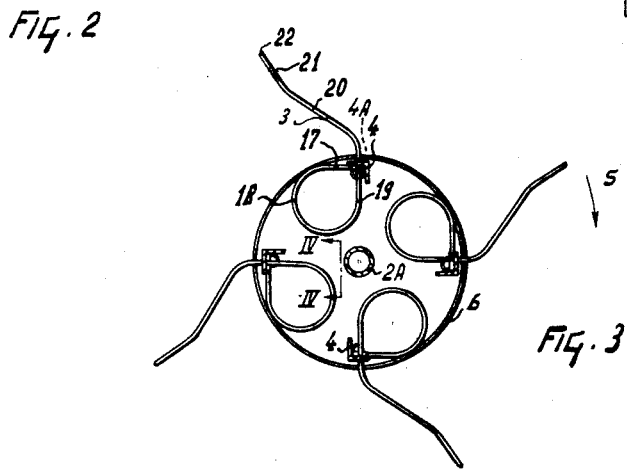

For a better understanding of the invention and to show how the same may be carried into effect, reference will now be made, by way of example, to the accompanying drawings, in which:

FIGURE 1 is a diagrammatic plan view of a tedder in accordance with the invention, FIGURE 2 is a view, to an enlarged scale, taken in the direction indicated by the arrow II of FIGURE 1, and showing a part of the tedder, FIGURE 3 is a section on the line III—III of FIGURE 2, FIGURE 4 is a section, to an enlarged scale, taken on the line IV—IV of FIGURE 3, FIGURE 5 is a section taken on the line V—V of FIGURE 4, FIGURE 6 is a view, to an enlarged scale, showing part of the tedder in greater detail, and FIGURE 7 is a section taken on the line VII—VII of FIGURE 6.

Referring to FIGURE 1 of the drawings, the tedder comprises a transverse frame 1 at opposite ends of which aligned horizontal bearings (not shown) are disposed, the horizontal bearings having rotatably mounted therein a cylindrically shaped body, generally indicated by the reference numeral 2. The body 2 is formed with a central shaft 2A whose longitudinal axis affords an axis of rotation for the whole body 2. The two ends of the cylindrical body 2 are afforded by support members in the form of discs 5 and 6 which are rigidly secured to the shaft 2A adjacent its opposite ends. A further disc 7 is rigidly secured to the shaft 2A midway between the said discs 5 and 6. The three discs 5, 6 and 7 support four bars 4, each of which is provided with tines 3 and each of which is spaced an equal distance radially of the shaft 2A. The bars 4 are also spaced from one another at 90° intervals around the axis of the shaft 2A.

The frame 1 is provided with a draw bar 8 with the aid of which the tedder may be coupled to a tractor or the like for the purpose of moving it over the ground. The frame 1 also has two ground-engaging wheels 9 and 10, the wheel 9 having means 9A for securing its angular relationship to the frame 1 in a desired setting and the wheel 10 having similar means 10A. Both the ground-engaging wheels 9 and 10 have means (not shown) whereby the levels of their axes of rotation relative to the frame 1 may be adjusted.

The body 2 is adapted to be rotated about the axis of the shaft 2A by drive derived from the power take-off shaft of the tractor or the like which is used to move the tedder over the ground with the aid of the draw bar 8. To this end a gear box or the like 11 is secured to the frame 1 in the region of the draw bar 8, the box 11 having an input shaft 12 which projects forwardly of the frame. Known means such as a coupling shaft provided at either end with a universal joint may be used to connect the input shaft 12 to the aforementioned power take-off shaft. Drive is transmitted from the gear box or the like 11 to the cylindrical body 2 by means including a shaft disposed within a casing 13 and an endless belt disposed within a further casing 14.

It can be seen in FIGURES 2 to 4 that the tines 3 are formed in integral pairs from single lengths of bent spring steel wire, each integral pair of tines being secured to a corresponding one of the bars 4, at a location defined by a hole formed therein, by means of a clamping plate 15 and a bolt 16. Each tine 3 is comprised by a straight portion 17 which, considered in a direction parallel to the axis of the shaft 2A (see FIGURE 3), extends parallel to that limb of the right-angled (in cross-section) bar 4 to which the tine is bolted. The straight portion 17 is integral with a curved portion 18 which, viewed in the direction just mentioned, has the shape of a segment of a circle subtending an angle of 270°, the curved portion 18 being integral with a further straight portion 19 which passes through a bearing hole 4A formed at a location in the limb of the bar 4 to which the tine is bolted. The straight portions 17 and 19 are thus inclined at 90° to one another. The straight portion 19 is connected by a bend of approximately 45° to a further straight portion 20, which, in turn is integral with a still further straight portion 21, the portions 20 and 21 being gently inclined to one another. Both the straight portions 20 and 21 of each tine 3 are inclined to a plane containing the axis of the shaft 2A and the extreme tip 22 of that tine. However, the angle between the straight portion 20 and the said plane is greater than the angle between the portion 21 and the plane.

The location at which any tine 3 is secured to a corresponding bar 4 by a bolt 16 is spaced from the location at which the straight portion 19 of the same tine is entered through the bearing hole 4A formed in the bar 4 (see FIGURE 2). Thus, the curved portion 18 of the tine lies in a plane inclined at a substantial angle of other than 90° to the axis of the shaft 2A. However, the straight portions 20 and 21 of the same tine are located in a plane which is perpendicular to the axis of the shaft 2A. It has been found that this method of construction and fixing of the tines 3 allows their straight crop-engaging portions 20 and 21 to be readily movable against the resilient opposition of the portions 18 to match undulations in the surface of the ground over which the tedder may move while at the same time, nevertheless, providing a degree of support for the portions 20 and 21 at locations not far removed from the tips 22. This latter feature minimizes undesirable vibrations of the tines 3.

Each bar 4 is turnable relative to the discs 5, 6 and 7. Each end of each bar 4 has a corresponding sleeve 23 welded or otherwise secured between the limbs of the bar (see FIGURES 4 and 5), a member in the form of a stub shaft 24 being entered in the sleeve 23 and through a hole of corresponding diameter formed in the adjacent discs 5 and 6. Each stub shaft 24 is formed with a head 26 at one end, the said head 26 preventing axial movement of the stub shaft 24 relative to the disc 5 or 6 in one direction. Each stub shaft 24 is fixed rotationally and axially relative to the corresponding sleeve 23 by means of a pin 25 which is entered through a hole in one of the limbs of the corresponding bar 4, aligned holes in the sleeve 23, and a transverse bore in the stub shaft 24. Each pin 25 is located at that side of the corresponding disc 5 or 6 which is remote from the corresponding head 26. It will be clear from FIGURE 4 that each bar 4 is prevented from performing any substantial axial movements in directions parallel to the axis of the shaft 2A but remains free to turn about an axis extending parallel to that of the shaft 2A. Each of the aforementioned heads 26 is shaped in such a way that accumulations of crop or other material do not tend to adhere to it.

The disc 7 which is secured to the shaft 2A and disposed approximately midway between support members afforded by the discs 5 and 6 is formed with four bearing holes 28 through which are entered the respective four bars 4. At the location at which each bar 4 passes through the corresponding bearing hole 28 it is provided with an external sleeve 27 which is secured to it by welding or other means. Each of the sleeves 27 has secured thereto a corresponding U-shaped bracket, generally indicated by the reference numeral 29. Each bracket 29 has two parallel limbs 30 and 31 in which aligned holes are formed. A locking pin 32 is entered through the aligned holes, the locking pin 32 having a bent handle 35 which bears against the inclined end face 34 of a sleeve 33 fixed to the limb 31 of the bracket 29.

The limbs 30 and 31 both extend parallel to the plane of the disc 7 and the point of the locking pin 32, which projects through the hole in the member 30, is urged into engagement with the disc 7 by a coiled compression spring 37 surrounding the pin 32 and bearing between one side of the limb 31 and a washer 38 which itself bears against a pin 39 entered in a lateral bore formed through the pin 32. As can be seen in FIGURE 6, the disc 7 is formed with an arcuate row of holes 36, the center of the arc being afforded by the longitudinal pivotal axis of the sleeve 27 about which the corresponding bar 4 is turnable. The tip of the locking pin 32 can be entered in any one of the holes 36 and is normally retained in this position by the spring 37. However, the locking pin 32 can readily be withdrawn from one of the holes 36 merely by twisting the handle 35 so that it rides up the aforementioned inclined edge 34. When the locking pin 32 is withdrawn, the whole bar 4 can be turned manually about the axis of the corresponding sleeve 27 and two sleeves 23 by means of, for example, the bracket 29 or the handle 35. Subsequently, after further twisting of the handle 35, the locking pin 32 is urged by the spring 37 to re-enter a different one of the holes 36. The brackets 29 together with their associated parts and the apertured disc 7 thus constitute retaining means for the bars 4.

Since only one bracket 29 is provided in respect of each of the bars 4, a simple construction is obtained in which the bars 4, and thus the tines 3, can be readily adjusted to suit the requirements of the particular conditions under which the tedder is to work. Due to the fact that each bracket 29 is mounted centrally of the corresponding bar 4, the transmission from the bar to the bracket of the forces which resist movement of the tines 3 during operation of the tedder is accomplished effectively.

During operation, the tedder is connected to a tractor or the like by means of the draw bar 8 and is moved in the direction indicated by the arrow I in FIGURE 1. The cylindrical body 2 is rotated about the axis of the shaft 2A in the direction indicated by the arrow S in FIGURE 3 and the crop is engaged by the tines 3, thrown rearwardly of the tedder and left spread on the surface of the ground in a diffuse manner which is conducive to the further drying thereof. The inclination of the axis of the shaft 2A to the direction I can be adjusted by appropriate setting of the aforementioned means 9A and 10A. The dispositions of the tines 3 and bars 4 are adjusted to suit the working conditions by engaging each one of the locking pins 32 in an appropriate one of the holes 36 of the corresponding row.

What I claim is:

1. In a tedder of the kind set forth, a rotating body including a plurality of horizontally extending tined bars, a pair of spaced support members supporting said bars, at least one of said bars turnable with reference to said support members about an axis parallel to the axis of rotation of said body, said bar including a bearing, at least one of said tines secured to said bar, said tine including a first bent portion extending from where it is secured to said bar to said bearing and a second portion extending outwardly from said bearing relative to said body, said first portion substantially lying in a plane oblique to the axis of rotation of said body and said second portion substantially lying in a plane perpendicular to the axis of rotation of said body, retaining means disposed substantially midway between said support members interconnecting said body and said bar, said retaining means including selection means for selectively securing said bar to said body with the second portion of said tines extending outwardly from said body at a selected angular setting.

2. In a tedder of the kind set forth, a rotating body including a plurality of horizontally extending tined bars, a plurality of bearings in said bars, each of said tines being secured at a first place on said bars rigidly thereto and received in one of said bearings at a second place, the portion of said tine between said first place and said second place being bent and resilient, said bent portion lying substantially in a plane oblique to the axis of rotation of said body.

3. In a tedder of the kind set forth, a rotating body including a plurality of horizontally extending tined bars, bearings included in each of said bars, each of said tines rigidly secured to one of said bars at a first place and received in one of said bearings at a second place, the portion of said tine between said first place and said second place being resilient and substantially following a segment of a circle, a further portion of said tine extending substantially normally outwardly from said body, said first mentioned portion lying in a plane oblique to the axis of rotation of said body.

4. In a tedder, in accordance with claim 3, wherein said segment is substantially 270°.

5. A tedder of the kind set forth which comprises a frame, ground engaging members connected to said frame providing support therefor, a pair of opposed mounting means carried by said frame, a horizontally disposed elongated support shaft rotatably mounted in said mounting means, a pair of spaced support members rigidly connected to said shaft close to said mounting means, a plurality of tined bars supported by said support members, said bars having longitudinal axes generally parallel to the axis of said shaft and being turnable about said axes with respect to said support members, stop members provided on each end of said bars operatively associated with said support members to prevent movement of said bars relative thereto in a direction parallel to the axis of said shaft, retaining means centrally positioned on said shaft and rigidly connected thereto, said retaining means interconnecting said bars and said shaft, and selective means included in said retaining means, said selective means including parts that firmly connect to each said bar and extend normally therefrom selectively securing said bars relative to said retaining means whereby each of said bars may be maintained at selected angular settings about their aforesaid longitudinal axes and substantially rigid with said retaining means.

References Cited in the file of this patent

UNITED STATES PATENTS

| | | |
|---|---|---|
| 207,010 | Bullard | Aug. 13, 1878 |
| 2,502,769 | Warnke | Apr. 4, 1950 |

FOREIGN PATENTS

| | | |
|---|---|---|
| 1,237,425 | France | June 20, 1960 |
| 169,530 | Sweden | Nov. 24, 1959 |